J. R. PEIRCE.
LISTING MACHINE FOR PAY ROLLS AND THE LIKE.
APPLICATION FILED SEPT. 1, 1909.

1,260,706.

Patented Mar. 26, 1918.
7 SHEETS—SHEET 1.

WITNESSES:

INVENTOR:
John Royden Peirce,
By Attorneys.

J. R. PEIRCE.
LISTING MACHINE FOR PAY ROLLS AND THE LIKE.
APPLICATION FILED SEPT. 1, 1909.
1,260,706.
Patented Mar. 26, 1918.
7 SHEETS—SHEET 2.
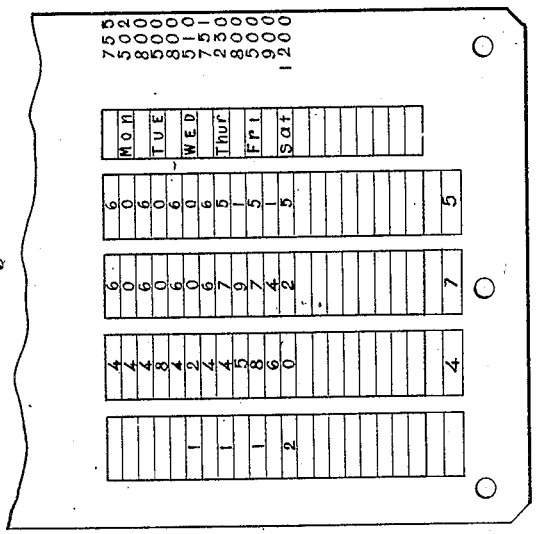
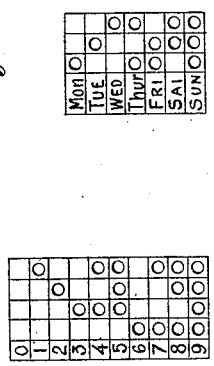
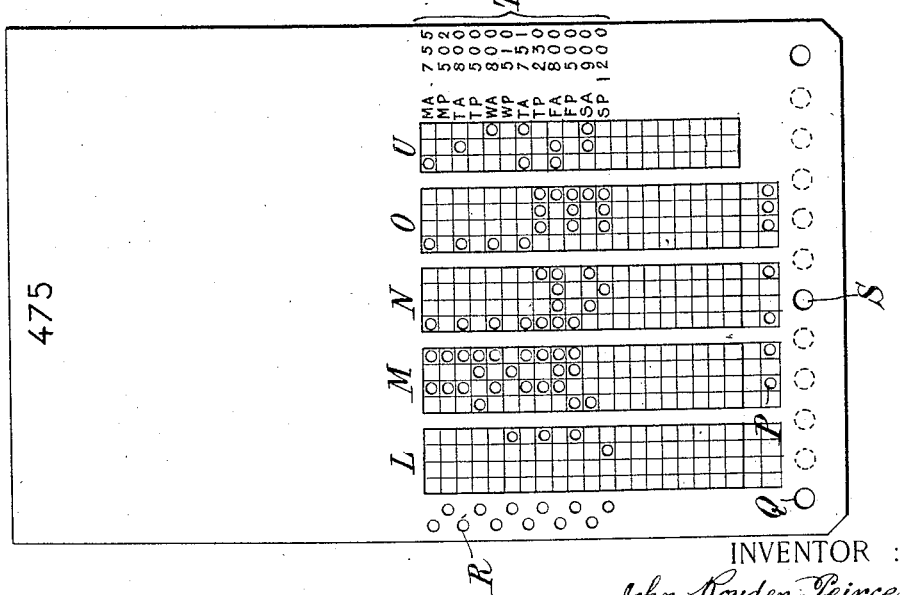
WITNESSES:
INVENTOR:
John Royden Peirce
By Attorneys, J. R. PEIRCE.
LISTING MACHINE FOR PAY ROLLS AND THE LIKE.
APPLICATION FILED SEPT. 1, 1909.
1,260,706.
Patented Mar. 26, 1918.
7 SHEETS—SHEET 3.
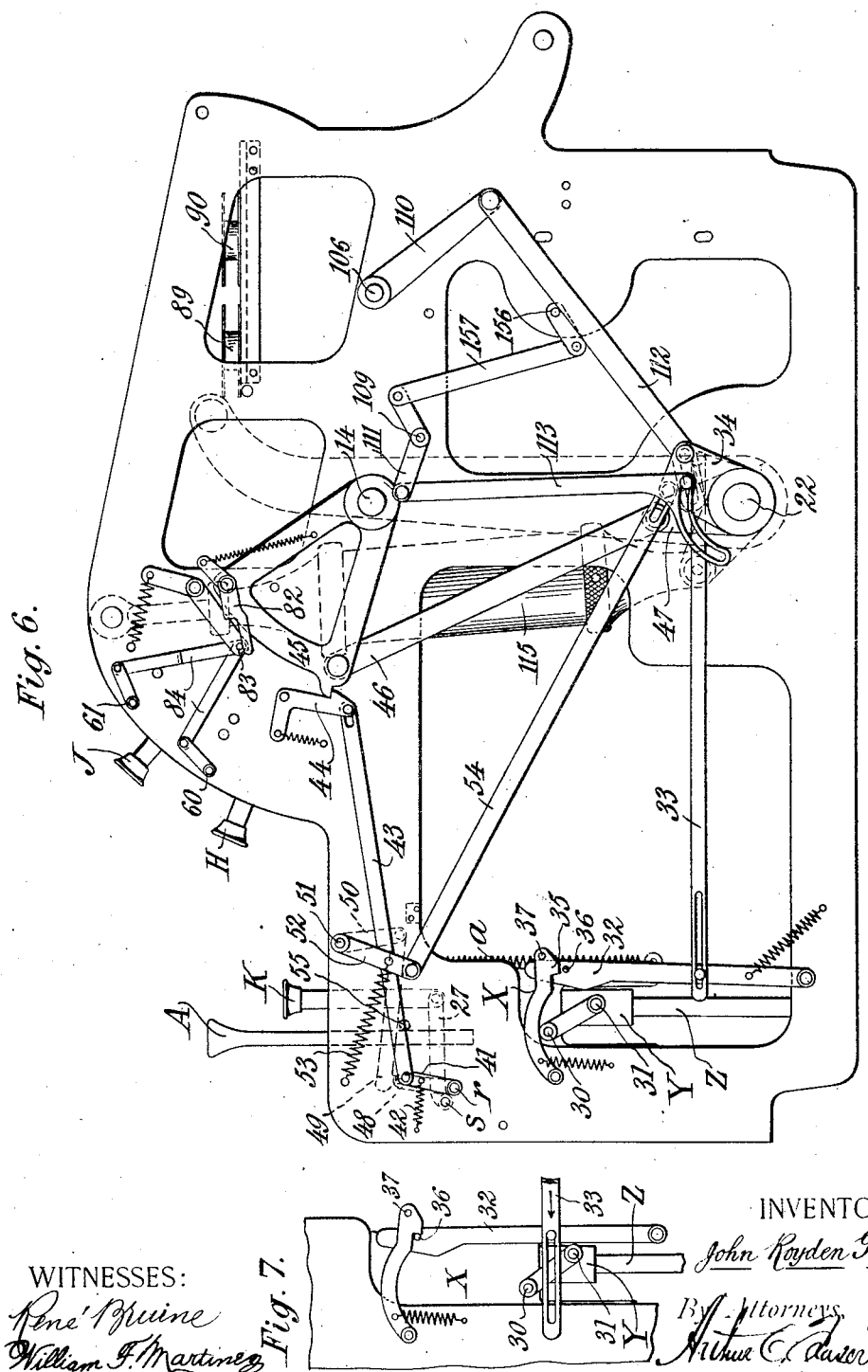
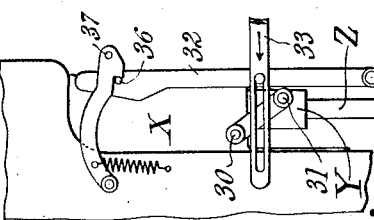
WITNESSES:
René Bruine
William F. Martinez
INVENTOR:
John Royden Peirce,
By Attorneys J. R. PEIRCE.
LISTING MACHINE FOR PAY ROLLS AND THE LIKE.
APPLICATION FILED SEPT. 1, 1909.

1,260,706.

Patented Mar. 26, 1918.
7 SHEETS—SHEET 4.

WITNESSES:
René Buine
William F. Martinez

INVENTOR :
John Royden Peirce,
By Attorneys
Arthur C. Rasert Usina

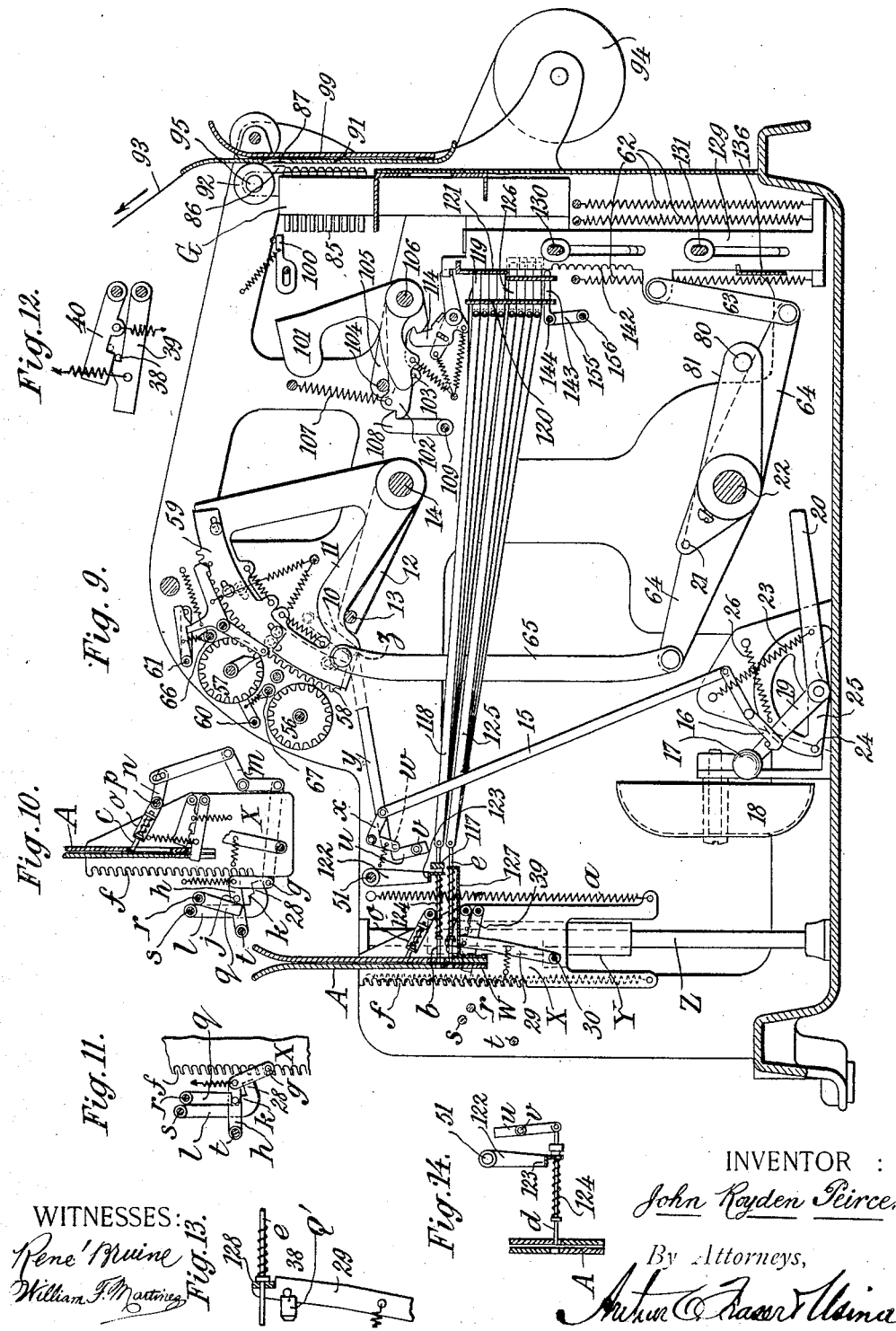

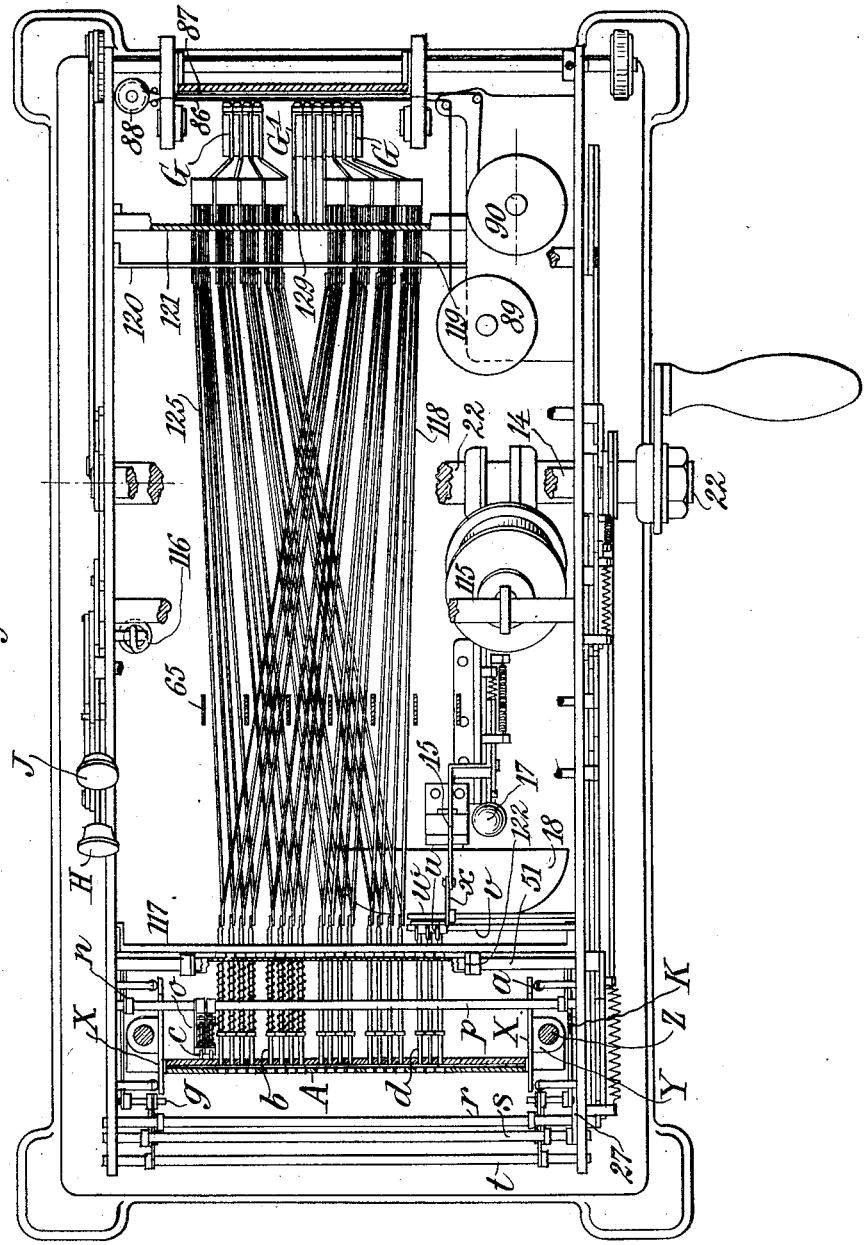

J. R. PEIRCE.
LISTING MACHINE FOR PAY ROLLS AND THE LIKE.
APPLICATION FILED SEPT. 1, 1909.
1,260,706.
Patented Mar. 26, 1918.
7 SHEETS—SHEET 7.
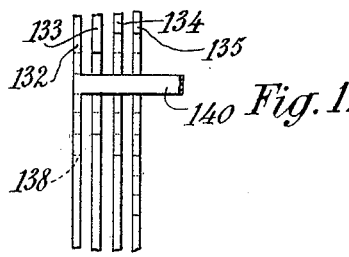
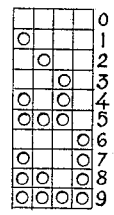
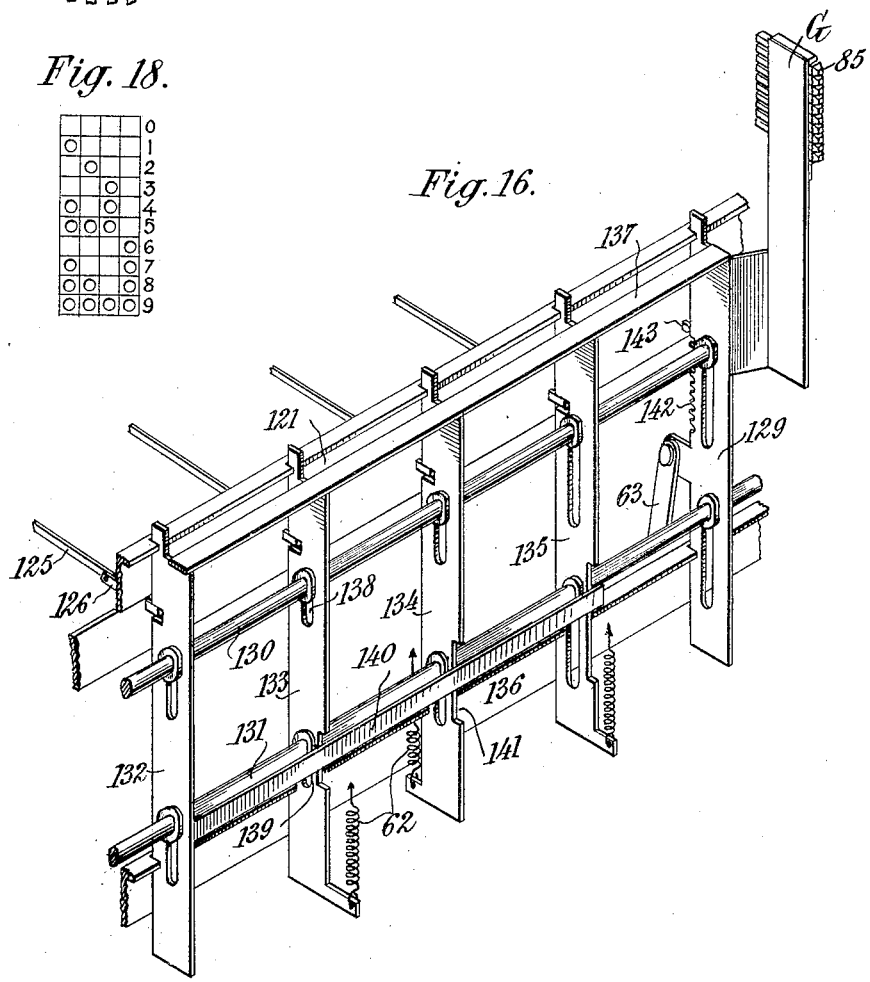
WITNESSES:
Rene Bruine
William F. Martinez
INVENTOR:
John Royden Peirce,
By Attorneys,
Arthur C. Fraser & Usina

UNITED STATES PATENT OFFICE.

JOHN ROYDEN PEIRCE, OF NEW YORK, N. Y.

LISTING-MACHINE FOR PAY-ROLLS AND THE LIKE.

1,260,706.  Specification of Letters Patent.  Patented Mar. 26, 1918.

Application filed September 1, 1909. Serial No. 515,705.

*To all whom it may concern:*

Be it known that I, JOHN ROYDEN PEIRCE, a citizen of the United States, residing in the borough of Manhattan, city, county, and State of New York, have invented certain new and useful Improvements in Listing-Machines for Pay-Rolls and the like, of which the following is a specification.

In my application for Patent No. 489,440, filed April 12, 1909, and in certain other previous applications I have described machines for calculating the pay of factory workmen, and perforating a card according to a determined system to indicate the amount due at the end of a day, week, or other interval of time. Similar cards may be used for other purposes.

The present invention relates to the use of cards of this class in a machine for listing or otherwise accounting for the pay of workmen or other items represented by such cards. The accompanying drawings illustrate an embodiment of the invention.

Fig. 2 is a face view of a card adapted to be used therein;

Fig. 3 is a key of the card shown in Fig. 2;

Fig. 4 is a table of the combinations of perforations to express different numbers;

Fig. 5 is a table of the combinations of perforations used to indicate different days of the week;

Fig. 6 is a right hand side elevation of the machine;

Fig. 7 is a detail of Fig. 6 with the parts in another position;

Fig. 9 is a vertical longitudinal section;

Figure 1:
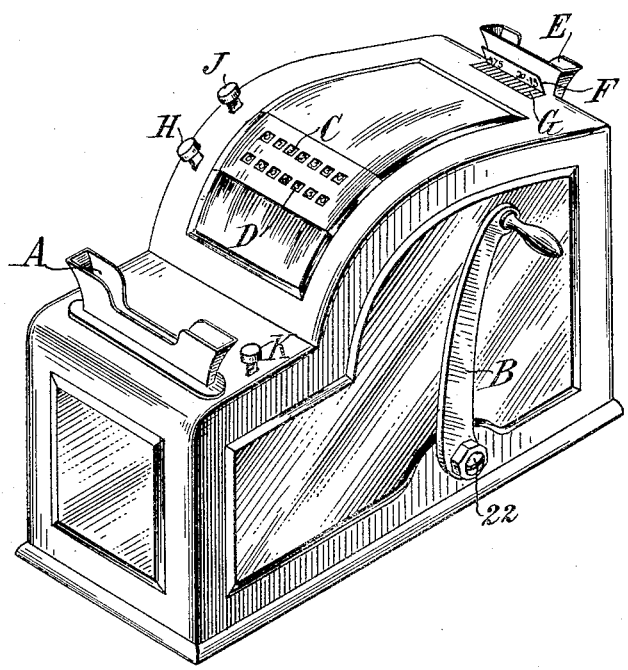
Figure 1 is a perspective view of the machine.

Figs. 10 to 14 inclusive are details of Fig. 9;

Fig. 15 is a horizontal section;

Fig. 16 is a diagrammatic perspective view of a type carrier and the combination slides for controlling it; the latter being shown widely separated for the sake of clearness.

Fig. 17 is a diagrammatic rear view of parts of the same.

Fig. 18 is a rear view of the table of Fig. 4.

Referring to the embodiment of the invention illustrated, the listing machine or recording machine is similar to recording machines designed for other specific purposes, and described in certain prior applications for patents which I have filed, especially Nos. 479,189, and 489,440. The card made by a workman's time recorder, or a factory cost clock, or by any other suitable machine, or indeed by hand, is inserted into a pocket A at one side which I call the front of the machine. The pulling of a handle B turns the total indicating registers C and D to add the last item to the previous totals so as to show on the respective registers a grand total and a sub total. At the rear, or side of the machine opposite the controlling card pocket A, is a pocket E for receiving an envelop, and in front of it a pocket or space for a list F to be kept by the bookkeeper. The envelop containing the amount of the item and an identifying number, such as the workman's number in the factory, goes to the cashier or pay clerk, who puts the indicated amount in the envelop and delivers it to the workman. A number of type carriers G move vertically in front of the first recording sheet or pay list F to bring the proper types into line, and inking ribbons or carbon paper or the like are introduced between the type carriers and the pay list, and also between the pay list and the second recording sheet or pay envelop in the pocket E; so that when the type are struck they print simultaneously the amount and the identifying number upon both the pay list and the envelop. This operation is effected by pulling forward the handle B when there is a controlling card suitably located in the pocket A. Ordinarily one operator will stand at the front of the machine to insert the controlling cards and pull the lever, and another operator at the rear to take care of the list and to introduce and withdraw the envelops.

When all the controlling cards relating to a subdivision of the list, as the cost cards for a particular piece of work, or the workmen's cards for a particular section of the factory, have been listed, a total may be recorded for this particular subdivision, which is called a "sub total", by first pulling the handle without the insertion of a controlling card, in order to clear the machine, and then pressing the key H and again pulling the handle. This will transfer to the types the number registered on the sub total register D, and will set this register back to zero, so that it will then begin to count from zero for the next sub total. When a grand total, including any number of sub totals is to be recorded, the key J relating to the "grand total" register C is similarly used. The two registers are alike, and it is their different uses only which distinguishes between them.

The third key K shown in Fig. 1 is used in case of a defective card in a manner hereinafter described.

The card shown in Fig. 2 contains four spaces or columns L, M, N and O, in which are punched various combinations of holes representing determined amounts. The first line of each column is punched on Monday morning, the second line on Monday afternoon, and the succeeding lines on the morning and afternoon of the succeeding days. Each column corresponds to one integer of the number to be expressed. Each integer is expressed by a combination of perforations in one or more of four spaces arranged horizontally in line with each other. Fig. 4 is a table showing the positions of the single perforations and combinations of perforations for the several integers from zero to nine. Comparing this table with perforations in the columns in Fig. 2, we obtain the integers shown in the key, Fig. 3, showing that the machine punched the number 466 in the card on Monday morning, 400 on Monday afternoon, &c. The machine in making such cards punches an arbitrary number on the morning of each day for reasons which are not important in connection with this invention; and on the afternoon of each day punches the amount of money due to the workman, including amounts due on this same card for previous days; thus, $4. Monday afternoon, $8. Tuesday afternoon, $12. Wednesday afternoon, &c. The lowest line represents the amount of money due on Saturday afternoon, $20.25 in the present case, and this is the amount which is recorded by the present listing machine. Below this total amount of money is punched a number, indicated at P, which is the workman's identifying number, No. 475 in the present case. At the lower corners of the card are perforations Q which serve to set the card accurately in the time recording machine, and also serve the same purpose in the present machine. At one margin of the card are located perforations R (staggered to save space) which are punched by the time recorder in succession simultaneously with the punching of each line of money perforations, and at corresponding vertical distances from each other. The card may be provided with other perforations and with printed matter of various sorts which have no bearing on the present invention; such for example as the perforations S controlling the rate of wages in the time recorder, the printed indications of the time of arrival and departure for each day, indicated at T, and the like.

It may happen occasionally that a workman after having his card punched in the morning will fail to have it punched when he leaves at the end of his day's work. Such a circumstance will be indicated by what I call "day perforations" in a column U on the card, a different perforation or group of perforations being used to indicate each day, in accordance with the table shown in Fig. 5. The time recorder makes a day perforation each morning, and no perforation in the afternoon, the failure to make such a perforation being determined by the existence of a day perforation in the next previous line. This system will indicate to the foreman or clerk whether or not a workman has skipped an outgoing punching of his card and the day on which such skipping occurred. This system is also useful in controlling the present machine, mechanism being provided whereby the existence or non-existence of one or more perforations in the line of the day perforation column corresponding with the last line on which there is a money entry perforated, determines whether the machine shall be locked or shall be permitted to operate. Thus if the card of Fig. 2 had not received an outgoing punching on Saturday afternoon, the lowest line punched would indicate the erroneous number 641. The fact that there are perforations in the day column on this line however, would prevent the machine from recording this amount, and the operator by pressing the key K previously referred to would set the machine to position for recording the last amount but one which is punched on the card, namely, $18.75, the amount due at the end of the previous day. The machine, of course, could not be used to determine the amount due for the last day's time, since the length of such time is not known by the machine.

The columns of perforations L, M, N and O may be made of greater or less length to take in a greater or less interval of time. The machine however is designed to take off the lowest money reading from these columns regardless of its position vertically on the card, and of its distance above the identifying number P, which is also to be listed.

Because of the varying distances between the money record and the identifying number which the machine may encounter upon different controlling cards, the machine is provided with two pockets for the said cards, an outer or fixed pocket A, and an inner movable pocket W in line therewith consisting of inner and outer plates fixed upon end plates X which are provided with slides Y running up and down on uprights Z at the sides of the machine. The end plates X are pulled upward at their four corners by means of springs $a$, and are limited in their upward movement only by the upper edges of the pocket W engaging the lower edges of the pocket A. On a line near the base of the pocket A are the amount feeling pins $b$, the positioning pins $c$, and the day perforation feeling pins $d$, and suitable perforations in the walls of the upper pocket to permit the said pins to pass through any perforations in the card which come into line with said pins. Engaging similar holes in the walls of the lower pocket are the identifying number feeling pins $e$ adapted to pass through the perforations corresponding to the identifying number on the card, and movable up and down with the lower pocket. The card is thrust into the machine by the operator and is mechanically stopped in position to bring the lowest line of amount perforations in line with the amount feeling pins $b$, the lower pocket moving a distance corresponding to the vertical distance between the lowest amount perforations and the identifying number perforations on the card, and being then stopped to prevent the further movement of the card.

This operation is secured by providing notches $f$ on the forward edge of each of the end plates X of the movable pocket, and by swinging a transverse rod $g$ into one of said notches at the proper instant, causing it to pull down an arm $h$ against the action of a spring until a pin $j$ carried by said arm strikes a shoulder $k$ on a swinging arm $l$ which is fixedly supported against vertical movement. The movement of the rod or pin $g$ is secured by connecting the same to a lever $m$ which is connected to a lever $n$ carrying one of the pins $c$ located in a slot in the rear wall of the upper pocket, and pressed forward by a spiral spring so that it bears always against the card in the pocket, and snaps into the first hole in the card which comes into alinement. Where two series of staggered holes are used in the card, as in Fig. 2, there are two arms $o$ on the shaft $p$ of the lever or arm $n$, each of which carries one of the pins $c$, so that whether the lowest perforation be staggered to the right or to the left it will engage one of the pins $c$. The further downward movement of the card carries down the engaged pin $c$ and turns the shaft $t$ to pull the locking pin $g$ inward, as above described. When the card reaches the limit of its downward movement, the pocket is held down by means of a locking arm $q$ which springs over the pin $j$. The locking mechanism is duplicated at the two ends of the pocket, the motion being transmitted from the left hand side to the right by extending the shafts $p$, $r$, $s$ and $t$ across as shown in Fig. 15.

When the card reaches its normal low position, the day feeling pins $d$ must find themselves against imperforate spaces on the card. Otherwise no record will be made. There are three of these pins as shown in Fig. 15, each being in line with one of the three spaces of the day perforations in the card. Each of them is connected at its rear end to one of the three levers $u$ (Figs. 9, 14 and 15) which are pivoted on a short shaft $v$, and the upper ends of which lie against a pin $w$ projecting laterally from a lever $x$ and normally pulled forward by a light spring. The lever $x$ is connected to the forward end of a link $y$ the rear end of which is connected to a pin $z$ on the swinging end of an arm 10, and which pin $z$ serves to lock the sectors 11 of the adding mechanism (without whose motion no record can be made) when it is thrust under the end of an arm 12 provided with a rod 13 extending transversely under the forward edges of the several sectors 11. The arm 12 is fixed on the shaft 14 on which the several sectors are pivoted, and this shaft is turned, in the backward movement of the handle of the machine, in a direction to throw the arm 12 and the rod 13 upward to re-set the several sectors. When the day feeling pins $d$ move forward, or when any one of them moves forward, its lever $u$ engaging the pin $w$ causes a rearward movement of the rod $y$ and a shoving of the locking pin $z$ under the edge of the re-setting arm 12 to prevent forward movement of the sectors. When, however, there is no forward movement of any one of the day feeling pins, the lever $x$ is held in its normal position by its spring, and there is no interference with the operation of the recording mechanism.

In addition to the preventing of the making of a record, the movement of any one of the day feeling pins and the consequent movement of the lever $x$ actuates an alarm, by pulling upward a link 15 which releases a hook 16 normally restraining a hammer 17 and permits the striking of this hammer against a bell 18 when the handle of the machine is pulled. The hammer is mounted on a lever arm 19 connected with a rearwardly extending lever arm 20 which is in position to be struck by a pin 21 carried on an arm fixed on the main shaft 22 of the machine, said arm 20 being pulled upward by a spring 23 to cause the striking movement of the hammer as soon as the hook 16 is withdrawn, and being pressed downward to re-set the hammer by engagement with the pin 21 upon the next operation of the machine. The rebound of the hammer to permit reverberation of the bell is effected by means of a pin 24 in the path of the hammer arm 19 and carried on a sector 25 which is permitted only a limted movement because of the location of its ends near the base of the machine, and which is retracted always to its rearward position promptly by a spring 26.

When the operator hears the alarm, he knows that no record has been made, and that the card must be advanced one step downward in the machine. He thereupon pushes the button K which (Fig. 6) is connected at its lower end to an arm 27 on the shaft s of the stop-arm l. The downward movement of the key K swings the arm l forward and brings a second shoulder 28 on the lower end of said arm under the pin j, so that the latter, and with it the lower pocket, are free to move down one step further. The holding down stop-arm q may be provided with an extra step enabling it to swing over the pin j in this advanced position, but the error will occur seldom, and the card may be easily held down by the operator's left hand while taking a record therefrom.

In order to insure the correct position of the card the setting holes Q therein are engaged by setting-pins Q' (Fig. 13) carried on the upper ends of arms 29 pivotally secured upon the sides X of the lower pocket, so that the card remains attached to the pocket as long as the setting arms are in their forward positions. These arms are pulled forward by springs and are moved backward through the shaft 30 upon which they are fixed. This shaft projects through at the right hand side of the machine (Fig. 6) and carries an arm with a pin 31 on its free end adapted to engage a cam 32 and to be pressed forward, thereby retracting the setting pins. The cam 32 is pivotally supported at its lower end, normally pulled back by a spring and advanced by a link 33 connected with an arm 34 on the main shaft 22. When it is moved forward it is held by a hook 35 snapping over a pin 36 on the cam, the hook being provided also with a pin 37 for limiting the rearward movement of the cam. Whenever a card is withdrawn and the pocket rises, the projecting end of the shaft 30 carried thereby strikes the under edge of the hook 35 and releases the cam which swings to its rearward inoperative position. At the end of a forward stroke of the handle of the machine, the pocket is down and when the link 33 moves the cam inward the cam is caught and held as in Fig. 7. Upon the rising movement of the pocket the pin 31 strikes the cam and causes the withdrawal of the setting pin, after which the hook 35 is lifted again so as to avoid interference of the cam with the setting pins during the downward movement of the pocket.

When the setting pins are retracted by the cam 32, they are held back so as to permit the withdrawal of the card at leisure. For this purpose the arms 29 are provided with pins 38 which snap over shoulders on the upper edges of arms 39 pivoted upon the end walls X of the pocket, and pulled upward by springs. The outer ends of the arms 39 enter slots in the lower edges of the walls of the pocket so as to be engaged by the lower edge of the card and pressed downward to release the setting pins in time for the latter to enter the setting holes of the card. This normally, that is to say when there is no card in the machine, serves to hold back the pins. But would not be effective when a card remains in the pocket after a complete operation of the machine. Since the card must be free at this time also, a second locking arm 40 is provided with a shoulder on its under edge, and the retraction of the setting arms by the cam above referred to is sufficient to carry the pin 38 back of said shoulder to the position shown in dotted lines in Fig. 12, where it is held as long as a card is in the pocket and the arms 39 are depressed. The arms 40, like the arms 39, are pivotally supported upon the end walls X of the pocket, and they are pulled downward by springs, but their forward ends do not extend into the path of the card. Each of the arms 39 is in line with the corresponding arm 40, and is pulled upward by a stronger spring, so that as soon as the card is withdrawn the arm 39 strikes the arm 40 and lifts it so as to allow the pin 38 to escape from the upper arm and to be caught and held by the lower arm in the normal position.

Until the card is in a determined position in the pocket, relatively to the day perforation, as above explained, the machine is locked against operation (though the handle is free). Also until the pocket has moved downward to the position in which it is locked by the arm q as previously explained, the machine is locked (and the handle also) against operation by the following mechanism. The shaft r which carries the locking arm q is provided at the right hand side of the machine (Fig. 6) with an arm 41 pulled forward by a spring 42 to effect the locking movement of the arm q; and the outer arm 41 is connected by a link 43 with a spring hook 44 adapted at the end of each operation to swing into engagement with a shoulder on a sector 45 mounted on the end of the sector shaft 14, and through which said shaft is turned, the sector being connected by a link 46 with an arm 47 on the main shaft 22.

Furthermore the pocket carrying the card after being once locked by the arm q, is held locked until the machine has been operated. Thereafter toward the end of the backward movement of the handle the locking arm q is withdrawn. For this purpose the shaft $r$ of said arm carries just within the right hand wall of the machine, a third arm 48 carrying a pin adapted to be engaged by a hook 49 connected at its rear end to an arm 50 fixed on a short shaft 51 passing through the frame of the machine, and having on the outside an arm 52 pulled forward by a spring 53 and rearward by a link 54 connected with slight play to the arm 34 on the main shaft. During the forward movement and a part of the rearward movement of the handle, the hook 49 is beyond the point of engagement with the pin on the arm 48. The last part of the rearward movement of the handle brings the hook 49 into engagement with the arm 48, causing a forward movement of the latter and a releasing movement of the locking arm $g$. The hook 49 is thereafter lifted to free the arm 48 so as to allow the locking arm $g$ to act promptly upon the insertion of a new card; the lifting of the hook being effected by a pin 55 carried on the end wall of the pocket at such a point as to strike the under edge of the hook shortly before the pocket reaches its uppermost position.

The adding mechanism in itself is of a well known type similar to that used in Burroughs adding machines, and need not be described in great detail. There are two sets of adding wheels 56, 57. Each of the sectors 11 carries two racks 58 and 59 for actuating the respective adding wheels. There are also two sets of "carrying" devices of ordinary type controlled by the shafts 60 and 61 respectively. In the normal operation of the machine, as the sectors 11 move forward the adding wheels are lifted out of engagement with their racks. After the making of a record on the forward movement of the handle, the adding wheels drop into engagement with their racks and are turned by the backward movement of the racks so as to add the last item to those previously registered.

The record to be made is determined by the extent of upward movement of the type carriers G, the upward movement being effected by strong springs 62 through intermediate devices hereinafter referred to, which intermediate devices are connected by means of links 63, arms 64 loose on the shaft 22, and links 65, with the sectors 11. The records made under control of the perforated card comprise numbers of only four decimal places (in the example illustrated). The totals however may run up to a greater number, and provision is made for seven decimal places in the adding wheels. The identifying numbers are not added, but only the amounts. For recording on the list the sub totals and grand totals, it is necessary to provide for an additional number of decimal places, as in the adding mechanisms.

Three supplementary type carriers G' are added for this purpose (see Fig. 15) at the left of the amount type carriers, and these may be connected to the corresponding sectors of the adding mechanisms without the interposition of the intermediate controlling devices previously referred to in connection with the regular recording type carriers. The levers 64 and links 63 and 65 are designed and arranged to secure for each sector a movement substantially equal to that of the corresponding type carrier.

Figure 8:
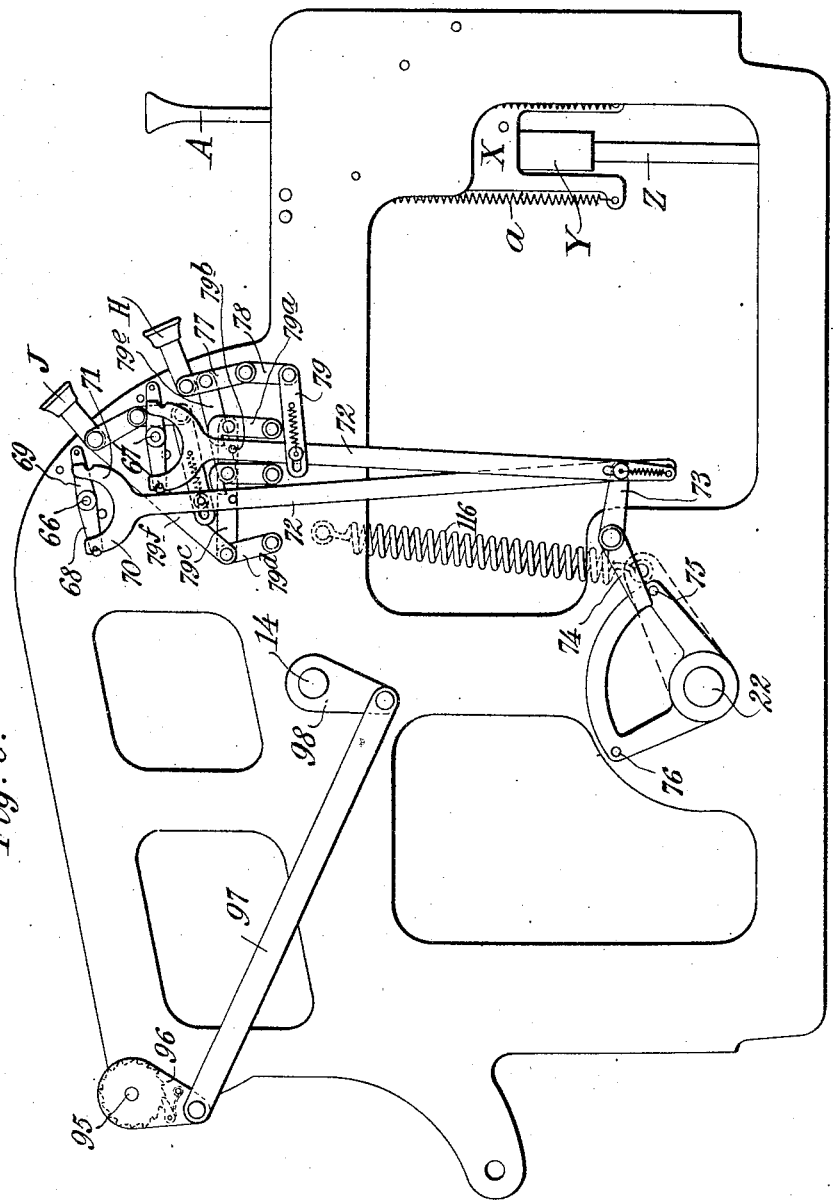
Fig. 8 is an elevation of the left hand side of the machine.

For taking off totals from the adding wheels and applying them to the type carriers, it is proposed also to use a common type of mechanism such as the Burroughs mechanism indicated in Fig. 8. The shafts 66 and 67 carry within the machine arms (not shown) which carry in their ends the shafts of the two groups of adding wheels 56 and 57, so that when the shafts 66 and 67 are turned to the right in Fig. 8 the adding wheels are thrown into gear. Each of the shafts 66 and 67 is provided with a pair of arms 68, 69 carrying on their ends pins adapted to be engaged by notches in opposite prongs 70 and 71 of a fork 72, the lower end of which is in engagement with an arm 73 of a lever whose opposite arm 74 lies in the path of a pair of pins 75 and 76 carried on the main shaft 22 and adapted to strike the arm 74 and move it in opposite directions alternately at the ends of the forward and backward movements of the handle of the machine. At the end of the forward movement of the handle, the pin 76 will strike the arm 74 and throw the fork 72 upward, turning the shaft 66 in the right hand direction to bring the adding wheels into engagement with their sectors and to cause the normal operation of adding upon the backward stroke; at the end of which the pin 75 causes a reverse operation of the shaft 66 and a withdrawal of the adding wheels.

When a total is to be taken off a set of adding wheels, it is done by bringing the sectors into engagement with said wheels and advancing them in a direction to rotate the wheels back to zero. As the normal direction of rotation of the wheels corresponds with a backward movement of the sectors, it must be on a forward movement of the sectors that the total is taken. Therefore the operation of the shafts 66 and 67 relatively to that of the handle of the machine is reversed, and this is accomplished by swinging the fork 72 forward, so that the prong 71 of this fork engages the pin on the forward arm 69 of its shaft, so that it is the pin 75 which at the end of the backward movement of the handle causes a rotation of the desired shaft, 66 or 67, forward to bring the adding wheels and sectors into engagement, while the pin 76 at the end of the forward movement of the handle causes a withdrawal of the adding wheels. This reversal of the normal action of either set of adding wheels is effected by the pushing of one of the keys H and J which are connected by levers 77 and 78 with links 79 engaging the forks 72. Ordinarily only one total will be taken off at a time, and only one of the keys H and J will be pushed.

When one total is taken off the recording type carriers move. Means are provided for preventing such movement from being impressed upon the other register of set of adding wheels. The shafts 66 and 67 move clockwise (looking at Fig. 8) when the adding wheels are to be thrown into engagement with their operating sectors. This corresponds to an upward movement of the forks 72 during the usual card-controlled operation of the machine; and to a downward movement of either fork when taking off a total from the register corresponding thereto. When a total is to be taken off either register the two hooks are locked against upward movement, thus preventing engagement with the operating sectors of the register which is idle and permitting such engagement with the register from which the total is to be taken. The locking mechanism comprises a pair of hooks 79$^a$ pivoted on the side frame of the machine adapted to take over pins 79$^b$, the hooks being connected together by a link 79$^c$ connected to an arm 79$^d$ and operated from the keys H and J by means of links 79$^e$ and 79$^f$.

The type carriers are normally returned to their zero position, and with them the sectors of the adding mechanisms by means of a rod 80 (Fig. 9) in engagement with the several levers 64 and carried on arms 81 which are fixed on the shaft 22. When the handle is pulled forward the type carriers are free to move upward under the pull of their springs. The sectors are then released by the moving down of the re-setting rod 13 as previously explained. The sector 45 by which the sector shaft 14 is actuated, carries also a pawl 82 of known type, arranged to strike a spring retracted pin 83 connected by means of links 84 to arms on the shafts 60 and 61 controlling the carrying mechanisms of the adding wheels. It is the action of the pawl 82 which frees the carrying mechanisms at the end of each stroke of the handle, so that by an idle backward and forward movement of the handle the adding mechanisms are cleared.

The type carriers G carry a number of type 85 adapted to be struck on their rear ends. In advance of the printing position the inking ribbon is arranged in two overlapping lengths 86 and 87, the bite of the ribbon passing over a guide pulley 88 and the ends being wound on spools 89 and 90.

Back of the first length 86 of ribbon is a plate 91 against which is guided by a friction roller 92, a continuous recording sheet or strip 93 which passes at its lower end from a roll 94. The guide roller 92 has a shaft 95 running through the left hand side frame of the machine and carrying a ratchet wheel with which engages a pawl carried by an arm 96 loose on said shaft, and connected by a link 97 with an arm 98 on the sector shaft 14, so that at each operation the recording sheet is advanced one step upward.

The inner plate 91 is apertured transversely and the outer length of ribbon 87 lies in said aperture. An outer plate 99 forms with said inner plate an envelop pocket. The upper edge of the inner plate 91 is bent forward to deflect the paper from the operator inserting envelops. The striking of the type in line with the ribbon prints the number and amount simultaneously upon both the listing strip and the envelop.

The hammer mechanism is also of the common type used in the Burroughs and other adding machines. It comprises a follower 100 adapted to be struck by a hammer 101 and quickly retracted. Each hammer is given a quick forward movement by means of an arm 102 carrying a pin 103 engaging the lower edge of an arm on the hammer, the hammer being retracted by a spring. The several arms 102 are retracted at the end of each operation by a transverse rod 104 overlying said arms and carried between arms 105 fixed on the shaft 106 upon which the hammers are loosely fitted. The arms 102 are drawn upward by springs 107 and are held downward by means of hooks 108 on a shaft 109. The shafts 106 and 109 pass through the right hand frame of the machine and are connected by arms 110, 111, and links 112, 113, with the arm 34 on the main shaft in such a way that the shaft 106 is actuated at the beginning of an operation to swing the transverse rod 104 upward and release the arms 102 of the several hammers, after which, when the type carriers have reached their desired positions, the shaft 109 swings the hooks 108 out of the way, and allows the arms 102 to jerk the hammers forward with a quick movement. For suppressing the zeros at the left of a number, supplementary hooks 114 are provided which are of ordinary type and need not be described in detail. They are withdrawn to release the arms 102 only when struck by a projecting portion of their own type carrier, or when the similar hooks of decimal places to the right have been withdrawn.

The shaft 22 is connected by means of an arm with a dash-pot 115 which permits it to move backward only at a moderate rate of speed, and is provided also with a retracting spring 116 for moving it backward when released. The arm 81 and rod 80 bearing on the levers 64 are not essential where the machine includes adding mechanism as well as recording mechanism, the action of the rod 13 under the sectors 11 being sufficient. Preferably however both the rod 80 and the rod 13 are maintained, thus avoiding strain on the connections between the adding mechanism and the recording mechanism.

For controlling the type carriers in accordance with the perforations in the card, a simple system of locks and feeling pins is provided. In line with each of the four amount columns L, M, N and O of the card, is a group of four feeling pins b above referred to. These pins are supported at their forward ends in the inner wall of the fixed pocket A, and pass at their rear ends through a fixed supporting bar 117 and are connected with links 118 extending from front to back of the machine in the oblique directions shown in Fig. 15. At their rear ends the links 118 are pivoted to locking pins 119 supported in cross bars 120 and 121 located just in front of the type carriers. For compactness the locking pins 119 of each group are arranged in oblique positions relatively to each other, so that they stand at different levels as shown in Figs. 9 and 16, and also at different positions laterally as appears from Figs. 15 and 16. Whenever the handle of the machine is pulled forward it turns the shaft 51 as previously explained. This shaft carries within the machine a pair of arms 122 at opposite sides of the feeling pins and which are connected at their lower ends by a transverse plate 123 through which the amount feeling pins b pass freely. When the shaft 51 turns, the plate 123 is advanced and compresses spiral springs 124 on the several pins, which springs bear against collars on the pins and press the latter forward. When any space on a card which is in register with a particular pin is perforated, the pin springs through such perforation and carries with it its link 118 and its lock 119. When the handle of the machine moves backward the cross bar or plate 123 engages a collar on the pins and withdraws all those which have been advanced, and continues to hold all the pins retracted.

Also in line with the columns L, M, N and O of the card, are the identifying number feeling pins e arranged in groups of four horizontally in line with each other. They are connected by means of links 125 with the groups of obliquely arranged locking pins 126 at the rear of the machine. While the links 118 of the amount mechanisms extend obliquely to the right the corresponding links 125 of the number mechanism extend obliquely to the left; these links thus controlling the number recording type carriers and the amount recording type carriers at the left and at the right of each other and serving to record the number and the amount in the same horizontal line. The number feeling pins e must be capable of vertical motion to accommodate the varying positions which the identifying number perforated in the card will assume for different cards. The pivotal connections at the two ends of the links 125 permit this vertical movement, and the pins e have their forward ends supported in the inner wall of the movable pocket W and their rear ends guided in a bracket 127 which is fast on the movable pocket. Spiral springs on the several pins tend to push them forward and they are allowed to move, following the movement of the setting arm 29. This arm is provided at its upper end with a cross bar 128 moving freely along the several pins and engaging a shoulder on each of the pins near its forward end. When the setting pins move in to the card, the number feeling pins e are released and are actuated by their springs. When the handle of the machine moves backward and the setting pins are withdrawn, the cross bar 128 withdraws all the number pins.

Each of the type carriers G is a simple vertical bar provided with a vertical extension 129 which is connected to one of the links 63 previously referred to, and by which the type carrier is connected with its adding machine sector. The type carriers G' which are not controlled from the card are directly in line with the extensions 129 thereof. The other type carriers G however are offset so as to bring them close together while allowing room for the controlling slides hereinafter referred to. A pair of guide rods 130 and 131 is arranged across the rear of the machine and serves to guide the extensions 129 of the several type carriers, and also the controlling slides 132, 133, 134 and 135 for each of the card controlled type carriers. These slides are also guided in notches in the rearward flanges of plates 121 and 136. They are locked by the locking pins 126 previously referred to entering notches in their forward edges. They control the type carrier through the lateral bar 137 extending from the type carrier over the tops of the several slides. When a type carrier is released by operating the handle of the machine, the springs 62 pull up such of the slides as are freed by the card, and the slide which moves highest determines the movement of the type carrier through the medium of the cross bar 137. When the handle of the machine is reversed the type carrier is pulled down as previously explained and through the cross bar 137 restores all the slides to the starting position. The several slides are limited in their capability of upward movement by the lengths of the slots 138, 139 in said slides through which the guide rods 130 and 131 pass. They are limited also in their movements relatively to each other by means of a cross bar 140 extending laterally from the first slide 132 through notches 141 in the edges of the other slides, which notches are of different lengths. The proportions and the manner of combining the movements will be understood from a comparison of the table, Fig. 4, with Fig. 16. (The extension and slides in Fig. 16 are separated laterally a great distance in order to show the construction clearly, but actually the lateral dimensions are comparatively short and the extension and slides are close alongside of each other).

For insuring an accurate locating of the type carriers, the extensions 129 are provided with notches 142 on their inner edges, and a setting pin 143 is located adjacent to said notches, one pin for each extension. These pins (Fig. 9) are mounted on a rod 144 passing between the upper ends of arms 155 on a shaft 156 which extends through the right hand frame of the machine, where it is connected by suitable arms and a link 157 to the shaft 109 for controlling the hammers. The proportions are such that just before the hammers strike, the setting pins 144 are thrust forward to engage the proper notches and holds the type carriers accurately in position.

The relation of the slides 132 &c. and their relative movements is shown most clearly in the rear view, Fig. 17, of the slides and the corresponding rear view of the locations of the perforations, Fig. 18. For No. 1 the position of the perforation shows that only the slide 132 is released; and its upward movement is limited to one step because the arm 140 strikes the upper shoulder of the slide 133. For No. 2 the slide 133 alone is released and moves up two steps where it is stopped by the engagement of its lower shoulder with the stationary arm 140. For No. 3 the slide 134 alone moves and is limited to three steps by the engagement of its lower shoulder with the stationary arm. For No. 4 the slide 132 and arm 140 move up one step, where they are stopped by the upper shoulder of the slide 133, and the slide 134 moves three additional steps until its lower shoulder strikes the arm 140. The remaining movements can be similarly traced.

Though I have described with great particularity of detail an embodiment of the invention, yet it must be understood that the invention is not restricted to the particular embodiment described. Various modifications in detail and in the arrangement and combination of the parts may be made by those skilled in the art without departure from the invention. To assist in the understanding of the claims hereinafter, I define certain terms therein as follows, it being understood that these definitions are not exclusive but are merely inclusive of the principal matters understood to be within the terms used.

The word "perforations" includes various equivalent differences such for example as protuberances, depressions, slots, weakened parts, and other differences in shape; and includes one or more perforations. The word "recording" refers either to printing or perforating, or to any other method of making a record; while the word "registering" is used to indicate the moving of the mechanism to an understood position either with or without the making of a record; and in some of the combinations claimed they may be substituted one for another without altering the novel invention involved. By "a machine of the class described" I mean to include not only the entire machine with the attachments referred to, but also the various unitary parts or sub-combinations of mechanism described.

What I claim is:—

1. A listing machine of the class described having a pocket at the front for a controlling card and a double pocket at the back for making two separate records, one a continuous list and the other a discontinuous succession of parts of said list.

2. A recording machine having a pocket for receiving a controlling card and a double pocket for receiving two recording sheets, and recording mechanism controlled by such a controlling card and adapted to make a record under such control on both said sheets simultaneously.

3. The combination with a recording mechanism adapted to be controlled by the perforations in a card, of means for feeding a continuous strip step by step to said recording mechanism to cause the recording of a continuous list and a pocket for receiving a single sheet at a time in position to cause the recording of a discontinuous succession of parts of said list.

4. The combination with a perforated card of a machine of the class described having a fixed pocket and a movable pocket, and means controlled by the position of the perforations in the card for determining the amount of movement of the movable pocket.

5. The combination with a perforated card of a machine of the class described having a fixed pocket and a movable pocket, and means carried by each of said pockets for determining the record in accordance with the perforations in the portions of the card lying in the respective pockets.

6. The combination with a perforated card of a machine of the class described, having a fixed pocket and a movable pocket, and means controlled by the position of the card in the fixed pocket for determining the amount of movement of the movable pocket.

7. The combination with a perforated card of a machine of the class described, having means for limiting the position of the card in accordance with the perforations therein, and manually actuated means for extending the limit.

8. The combination with a perforated card of a machine of the class described, having means for locking the machine against operation, until the card is introduced to a determined position, said means including a part movable transversely into and out of a perforation in the card.

9. The combinaion with a perforated card of a machine of the class described, having a handle and means for locking the handle until the card is properly placed therein, said means including a part movable transversely into and out of a perforation in the card.

10. The combination with a perforated card of a machine of the class described, having a handle and means for locking the mechanism while leaving the handle free in case of a defective card.

11. The combination with a perforated card of a machine of the class described having a handle and means for locking the handle and means for locking the mechanism, said locking means being operative one in case the card is defective and the other in case the card is improperly placed.

12. The combination with a perforated card of a machine of the class described having a handle and means for locking the handle until the card is properly placed therein, and means for locking the mechanism while leaving the handle free in case of a defective card.

13. The combination with a card having a certain controlling portion, of a machine of the class described having mechanism for permitting or preventing its operation by the absence or presence of a perforation in said controlling portion, and having an alarm actuated when the operation is so prevented.

14. The combination with a card having a certain controlling portion, of a machine of the class described having mechanism for permitting or preventing its operation by the absence or presence of a perforation in said controlling portion, and having means for shifting the position of the card in the machine so as to bring a perforated portion into the position first occupied by a non-perforated portion.

15. The combination of a card provided with a group of perforations, of a recording machine having a type carrier and a corresponding group of slides controlling the position of said carrier, and means controlled by the group of perforations in the card for selecting and causing the actuation of a determined slide or combination of slides of said group.

16. A machine of the class described having a pocket adapted to be pushed inward by a card inserted therein, and means controlled by the card for limiting the inward movement thereof.

17. A machine of the class described into which a card may be thrust to different depths, said machine including a pin in position to enter a perforation in said card when the perforation arrives in register with the pin, said pin being movable with the card after entering such a perforation, and means controlled by such movement of the pin for stopping the card at a determined position relatively to such perforation.

18. The combination with a perforated card of a machine of the class described having a pocket adapted to be pushed inward by inserting said card therein, a pin $c$ yieldingly pressed against said card so as to be engaged by a perforation in the card and carried forward, a locking pin $j$ adapted to be connected to the pocket upon said forward movement of the pin $c$, a stop $l$ for limiting the forward movement of said locking pin, and a lock $q$ for engaging and holding said locking pin in the forward position to which it is carried by its connection with said pocket.

19. A machine of the class described having an outer fixed pocket and an inner movable pocket, in combination with a perforated card having portions adapted to lie respectively in said outer and inner pockets and recording mechanisms controlled respectively by the portions of the card in said outer and inner pockets.

20. The combination with a perforated card of a machine of the class described having an outer fixed pocket and an inner movable pocket, and means for determining the movement of the inner pocket by the position of said card relatively to the outer pocket.

21. The combination with a perforated card of a machine of the class described into which said card may be thrust, and having means controlled by the card for limiting the depth to which it may be thrust into the machine, and manually operated means for increasing such depth.

22. A machine of the class described having a pocket adapted to be pushed inward by a card inserted therein, a pin $c$ yieldingly pressed against said card so as to be engaged by a perforation in the card and carried forward, a locking pin $j$ adapted to be connected to the pocket upon said forward movement of the pin $c$, a stop $l$ for limiting the forward movement of said locking pin, and a lock $q$ for engaging and holding said locking pin in the forward position to which it is carried by its connection with said pocket, said stop $l$ being stepped and being movable to provide a plurality of limiting positions.

23. A machine of the class described into which a card may be thrust and having setting pins for engaging and holding the card in position, and means actuated by the introduction of the card for causing the operation of said setting pins, a shaft 30 on which said setting pins are carried and which is movable with the card, a withdrawing pin 31 carried by said shaft, a cam 32, and means for holding said cam in the path of said pin to effect a turning of the shaft and a withdrawing of the setting pins toward the end of an operation of the machine.

24. A machine of the class described having a pocket into which a card may be thrust and which is movable with the card, and means for locking the machine against operation until said pocket has moved to a determined position.

25. A machine of the class described into which a card may be thrust to a determined position, said machine having a handle, and means for locking the mechanism while leaving the handle free in case of a defective card.

26. A machine of the class described into which a card may be thrust to a determined position, said machine having a handle, and means for locking the mechanism and means for locking the handle, said locking means being operative one in the case of a defective card and the other in the case of an improperly placed card.

27. A machine of the class described into which a card may be thrust to a determined position, said machine having a handle, and means for locking the handle of the machine until the card is properly placed therein, and means for locking the mechanism while leaving the handle free in case of a defective card.

28. A machine of the class described into which a card may be thrust to a determined position, a card lock $q$ for holding the card in said position, a shaft $r$ actuating said lock, and a recording mechanism lock 44 actuated by said shaft to hold the recording mechanism locked when the card is unlocked and to reverse the operation.

29. A machine of the class described into which a card may be thrust to a determined position, a card lock $q$ for holding the card in said position, a shaft $r$ actuating said lock, and a recording mechanism lock 44 actuated by said shaft to hold the recording mechanism locked when the card is unlocked and to reverse the operation, a spring for turning said shaft to position to lock the card, and mechanism actuated by the handle of the machine for turning said shaft in the opposite direction.

30. A machine of the class described including in combination perforated-card-controlled registering mechanism, totaling mechanism, oscillating sectors for actuating said totaling mechanisms, type carriers, levers, and links connecting to said levers the respective sectors and type carriers to effect corresponding movements thereof.

31. A machine of the class described including in combination perforated-card-controlled registering mechanism, totaling mechanism, oscillating sectors 11 for actuating said totaling mechanism, reciprocating type carriers G, levers 64 and links 63, 65 connecting the respective ends of said levers with said sectors and type carriers and adapted to effect substantially equal movements thereof.

32. A perforated-card-controlled registering machine comprising recording mechanism including types, a plurality of inking ribbons located in positions to transfer impressions of the same type onto a corresponding plurality of recording sheets, means for feeding a recording sheet past one of said ribbons, and a pocket for holding an envelop in a fixed position to receive an impression from another of said ribbons simultaneously.

33. A perforated-card-controlled registering machine comprising recording mechanism including types, an inking ribbon arranged in two lengths in front of said types with space between for a recording sheet, means for feeding said recording sheet, and a pocket 91, 99 in rear of the rearmost length of ribbon for holding an envelop in a fixed position.

34. The combination with a card having two sets of perforations, one set located in line with the other, of a mechanism of the class described adapted to receive said card and having two sets of pins also located in line with each other adapted to enter said two sets of perforations in the card, and means controlled by said pins for recording the numbers represented thereby alongside of each other horizontally, one of said sets of pins being movable toward and away from the other.

35. The combination with a perforated card of a machine of the class described including two sets of type carriers G, locking pins 119 and 126 for determining the positions of said type carriers, feeling pins $b$ and $e$ adapted to enter perforations in said card, and connecting links 118 and 125 connecting said stop pins to said feeling pins, one set of feeling pins being movable relatively to the other.

36. A machine of the class described including in combination two sets of type carriers G, locking pins 119 and 126 for determining the positions of said type carriers, feeling pins $b$ and $e$ adapted to enter perforations in a card, and connecting links 118 and 125 connecting said stop pins to said feeling pins, one set of type carriers being arranged alongside of the other, and one set of feeling pins being arranged above the other.

37. The combination with a perforated card of a machine of the class described adapted to receive said card in any one of three or more different positions, said machine including a registering or recording mechanism and controlling means therefor, said controlling means being controllable from said card in any one of said plurality of positions.

38. The combination with a perforated card, of a machine of the class described including a set of type carriers G, locking pins 126 for determining the positions of said type carriers, feeling pins $e$ adapted to enter perforations in said card, and connecting links 125 flexibly connecting said locking pins with said feeling pins to permit control of the former by the latter in different positions.

39. The combination with a perforated card of a machine of the class described including recording mechanism and means for permitting or preventing the operation of said mechanism by the absence or presence of perforations at a particular point on said card, and means for shifting the position of the card in the machine so as to bring a perforated point thereof into the position first occupied by a non-perforated point thereof.

40. The combination with a perforated card of a machine of the class described including recording mechanism and means for permitting or preventing the operation of said mechanism by the absence or presence of perforations at a particular point on said card, said means comprising pins $d$ pressed toward the card, levers $u$ connected to said pins, and a lock actuated by said lever when said pins pass through perforations in the card and a spring for holding said lock normally withdrawn.

41. The combination with a perforated card of a machine of the class described including recording mechanism and means for permitting or preventing the operation of said mechanisms by the absence or presence of perforations at a particular point on said card, said means comprising pins $d$ pressed toward the card, "amount" feeling pins $b$ fixedly located relatively to said pins $d$, and "identifying number" feeling pins $e$ movable relatively to the aforesaid pins, said recording mechanism being controlled by said "amount" feeling pins and said "identifying number" feeling pins.

42. A machine of the class described including in combination perforated-card-controlled registering mechanism, a type carrier, a group of slides controlling the position of said carrier according to the slide or combination of slides actuated, and means for selecting the several slides or combinations thereof.

43. A machine of the class described including in combination perforated-card-controlled registering mechanism, a type carrier G, a group of interengaged slides 132, 133, 144 and 145 adapted to engage a part of said carrier, springs for actuating said slides, and pins 126 engaging said slides and adapted when withdrawn to permit actuation of said slides and to cause movement of said carrier.

44. A machine of the class described including in combination perforated-card-controlled registering mechanism, a type carrier G, a group of interengaged slides 132, 133, 144 and 145 adapted to engage a part of said carrier, springs for actuating said slides, and pins 126 engaging said slides and adapted when withdrawn to permit actuation of said slides and to cause movement of said carrier, a cross-bar 140 carried by one of said slides and adapted to be engaged with the others so as to permit movements of said slides relatively to each other.

In witness whereof, I have hereunto signed my name in the presence of two subscribing witnesses.

JOHN ROYDEN PEIRCE.

Witnesses:
WILLIAM F. MARTINEZ,
D. ANTHONY USINA.